United States Patent [19]

Matsushita et al.

[11] Patent Number: 4,528,121

[45] Date of Patent: Jul. 9, 1985

[54] ELECTROCONDUCTIVE CERAMICS

[75] Inventors: Yasuo Matsushita; Kousuke Nakamura, both of Hitachi; Tetuo Kosugi, Ibaraki, all of Japan

[73] Assignee: Hitachi, Ltd., Tokyo, Japan

[21] Appl. No.: 546,094

[22] Filed: Oct. 27, 1983

[30] Foreign Application Priority Data

Oct. 27, 1982 [JP] Japan ................... 57-187598

[51] Int. Cl.³ .................... H01B 1/04; H01B 1/06
[52] U.S. Cl. .................... 252/516; 252/518; 252/520; 252/521; 501/87; 501/96; 501/98; 501/127; 501/128; 501/153
[58] Field of Search ............ 252/518, 516, 520, 521; 419/42, 56, 57, 14; 264/61, 65, 66; 501/89, 91, 92, 96, 87, 153, 98, 134, 105, 106, 107, 102, 127, 128, 108, 118, 119; 219/542, 543

[56] References Cited

U.S. PATENT DOCUMENTS

| 3,875,746 | 4/1975 | Crandall et al. ............ 252/516 |
| 3,895,219 | 7/1975 | Richerson et al. ........... 252/516 |
| 3,968,057 | 7/1976 | Dulin ........................ 252/516 |
| 4,006,106 | 2/1977 | Yoshida et al. .............. 252/516 |
| 4,008,183 | 2/1977 | Ishii et al. ................. 252/516 |
| 4,443,361 | 4/1984 | Hierholzer et al. ........... 252/518 |

Primary Examiner—Josephine L. Barr
Attorney, Agent, or Firm—Antonelli, Terry & Wands

[57] ABSTRACT

Electroconductive ceramic materials with high density, high mechanical strength, high endurance to repeated current supply and excellent thermal shock resistance can be obtained by mixing 5 to 70 parts by weight of $Al_2O_3$ or alumina ceramic materials containing 95% by weight or more of $Al_2O_3$ and 30 to 95 parts by weight of at least one electroconductive material selected from of $ZrB_2$, $ZrC$, $ZrN$, $ZrSi_2$, $TaB_2$, $TaC$, $TaN$, $TaSi_2$, $TiB_2$, $TiC$, $TiN$, $Mo_2B_5$ and $MoSi_2$ adding a molding binder, molding the mixture and sintering the molded mixture. The electroconductive ceramic is usable for heaters, glow plug heaters, electrical gas ignitors, kerosine gasifying burners, and electrodes or conductors for water processing or dialysis.

5 Claims, 4 Drawing Figures

ELECTROCONDUCTIVE CERAMICS

BACKGROUND OF THE INVENTION

1. Field of the Invention

This invention relates to an electroconductive ceramic having good electroconductivity and a process for the production of the ceramic.

2. Description of the Prior Art

The materials such as silicon carbide (SiC), lanthanum chromate (LaCrO$_3$) and zirconia (ZrO$_2$) are known as electroconductive ceramic materials. These electroconductive ceramic materials, however, have a relatively high electrical resistance which does not become lower than about $10^{-2}$ Ωcm even when heated at a temperature as high as 1,000° C. Also, these ceramic materials have a negative resistance-temperature characteristics, that is, their electrical resistance decreases as the temperature increases, so that when heated at a high temperature, they tend to cause a thermorunaway due to sharp increase of electric current, making the temperature control very difficult. Further, said ceramic materials are usually porous and hence low in mechanical strength.

Furthermore, an electroconductive ceramic comprising ZrB$_2$, TiB$_2$, TiN, ZrN, TaC, ZnC or etc. and a matrix of SiC is known. This is disclosed in Y. Matsushita et al U.S. Ser. No. 497,577 filed May 24, 1983 (corresponding to Japanese Patent Application No. 89926/82.)

SUMMARY OF THE INVENTION

The object of this invention is to provide novel electroconductive ceramics which is free of the abovementioned defects of conventional electroconductive ceramics and which has a high mechanical strength, a low electrical resistance and a positive resistance-temperature characteristic.

The inventors have found out the materials which can realize the object of this invention by providing alumina (Al$_2$O$_3$) ceramics and specified electroconductive substances having a positive resistance-temperature coefficient.

In accordance with this invention, there are provided an electroconductive sintered ceramic which comprises, as main ingredients thereof, (a) alumina only or an aluminous ceramic material containing 95% by weight or more of Al$_2$O$_3$, and (b) an inorganic compound which exhibits a positive resistance-temperature coefficient, and a process for producing an electroconductive sintered ceramic, which comprise mixing (a) alumina only or aluminous ceramic materials containing 95% by weight or more of Al$_2$O$_3$, and (b) an inorganic compound which exhibits a positive resistance-temperature coefficient, adding to the mixture a molding binder, molding the mixture into a desired shape, and sintering the molding under vacuum or in an inert gas.

DETAILED DESCRIPTION OF PREFERRED EMBODIMENTS

Figure 1:
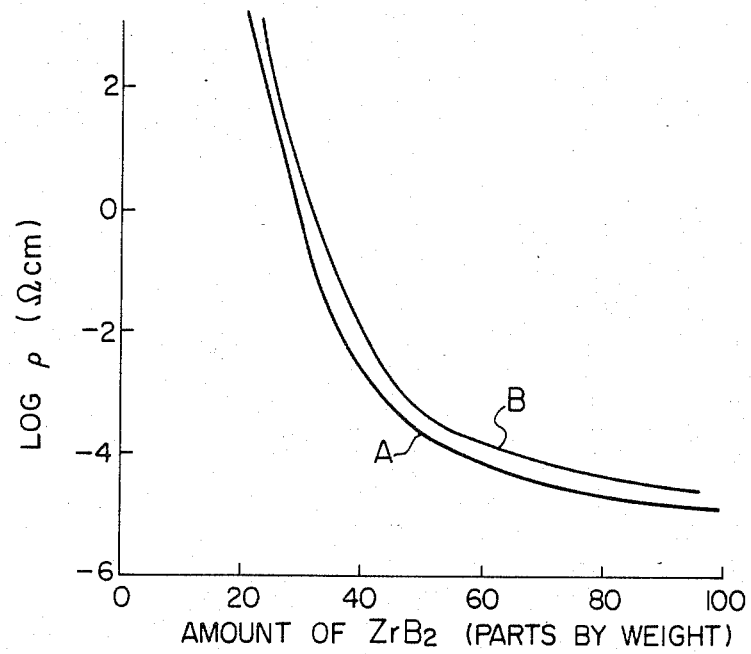
FIG. 1 is a graph showing the relation between resistivity and mixed amount of an electroconductive additive in one of the electroconductive alumina composite ceramics according to this invention.

According to this invention, an electroconductive ceramic is provided by dispersing an electroconductive non-oxide material having the properties analogous to those of metals into alumina only or into an aluminous ceramic phase mainly composed of Al$_2$O$_3$, and densely sintering the mixture.

All electroconductive substances having a positive resistance-temperature coefficient are not effective in this invention. For example, an electroconductive ceramic containing a metal powder added thereto has a desired resistance-temperature characteristic but it is poor in oxidation resistance at a high temperature. Therefore, such electroconductive ceramics are not suitable as a heater material for a glow plug.

As the electroconductive non-oxide material used in this invention, there can be employed carbides, nitrides, borides and silicides of Groups IVa and Va of the Periodic Table, for example, zirconium compounds such as zirconium boride (ZrB$_2$), zirconium carbide (ZrC), zirconium nitride (ZrN) and zirconium silicide (ZrSi$_2$), tantalum compounds such as tantalum boride (TaB$_2$), tantalum carbide (TaC), tantalum nitride (TaN), tantalum silicide (TaSi$_2$), and titanium compounds such as titanium boride (TiB$_2$), titanium carbide (TiC) and titanium nitride (TiN), and molybdenum compounds such as molybdenum boride (Mo$_2$B$_5$) and molybdenum silicide (MoSi$_2$). These compounds are suitable for use as the electroconductive material in this invention because they have a positive resistance-temperature coefficient and are low in electrical resistance, scarcely fusible, high in high-temperature strength and excellent in acid resistance.

On the other hand, alumina is known as a typical ceramic material having a negative resistance-temperature coefficient ($-4.995 \times \deg^{-1} \cdot 10^3$). The abovementioned electroconductive materials have a melting point of not lower than 2,000° C. and a resistivity of not higher than $10^{-4}$ Ωcm. The addition of the abovementioned electroconductive materials having a positive resistance-temperature coefficient to alumina or aluminous ceramic material allows the alumina or aluminous ceramic, which is inherently electrically insulative, to exhibit electrical conductivity. That is, the use of the electroconductive ceramics as a heater material prevents the generation of out-of-control current and makes it easy to control current and maintain the superficial temperature of a heater constantly.

To the alumina or aluminous ceramics used in this invention, there may be added a sintering aid for alumina and a particle growth regulator in a total amount not exceeding 5% by weight based on the amount of Al$_2$O$_3$. As the sintering aid, there may be used, for example, at least one of MgO, SiO$_2$CaO, Li$_2$O, TiO$_2$ and etc., and as the particle growth regulator, one may use MgO. The reason for the selection of alumina or aluminous ceramics as the matrix phase in this invention is that alumina has a high heat resistance, a high mechanical strength and an excellent acid resistance and also its thermal expansion coefficient is either almost equal to or relatively close to those of said compounds used as the electroconductive material in this invention, such as $ZrB_2$, $ZrC$, $ZrN$, $ZrSi_2$, $TaB_2$, $TaC$, $TaN$, $TaSi_2$, $TiB_2$, $TiC$, $TiN$, $Mo_2B_5$ and $MoSi_2$, so that alumina provides a best combination with said electroconductive material, and also when, for instance, the product of this invention is used as a high-temperature heater material, it exhibits a high endurance against heat shock given when instantaneously red heated by supplying electric current.

The electroconductive ceramics according to this invention can be produced, for example, by first mixing an $Al_2O_3$ powder with such an electroconductive material as mentioned above in amounts of 5-70 parts by weight and 30-95 parts by weight, respectively, adding thereto a molding binder such as carboxymethyl cellulose (CMC) or polyvinyl alcohol (PVA), preferably in an amount of 10-20 parts by weight, molding the mixture into a desired shape, and sintering the molding under vacuum or in an inert gas such as argon or nitrogen gas at a temperature within the range of 1,400° to 1,700° C., preferably 1500° to 1600° C., to form a sintered body having a theoretical relative density not less than 80%, especially above 90%.

In this invention, the amount of alumina or aluminous ceramic material mainly composed of $Al_2O_3$ and the amount of an electroconductive material mixed are defined as being in the abovementioned proportion for the following reasons: if the amount of the electroconductive material mixed is less than 30 parts by weight, the electrical resistivity of the produced ceramics will be greater than 1 $\Omega$cm and also the resistance-temperature coefficient of the ceramics will be negative, while if the amount of said electroconductive material mixed exceeds 95% by weight, the produced ceramic will prove poor in their properties such as mechanical strength and heat shock resistance.

According to this invention, as illustrated in detail in the following examples, it is possible to obtain the electroconductive composite ceramic having a desired resistivity within the range of $10^3$ to $10^5$ $\Omega$cm by properly adjusting the amount of the electroconductive material mixed. Also, the ceramic has a positive resistance-temperature characteristic so that there is no fear of fusing due to current runaway, i.e., due to generation of out-of-control current, even when brought into a red hot state. Further, the ceramic of this invention has a high density and a high mechanical strength and are also excellent in endurance to repeated supply of electric current and in thermal shock resistance.

Owing to these excellent properties, the electroconductive ceramic of this invention finds a wide scope of uses, for example, it can be applied to various types of heaters, glow plug heaters or electrical gas ignitors by making use of its quickly heated character, kerosine gasifying burners, electrodes for use in chemical industries, for example, electrodes for water processing or dialysis, electrodes or conductors for high-temperature uses, etc.

This invention will be described in further detail hereunder with reference to some examples thereof.

EXAMPLE 1

An $Al_2O_3$ powder having an average particle size of 0.5 $\mu$m and a $ZrB_2$ powder having an average particle size of 2 $\mu$m were mixed in various ratios, and to each mixture was added a 3% PVA solution in an amount of 10% based on the whole amount of the mixture, followed by mixing by a stirring kneader. Then the mixed powder was molded under a pressure of 1,000 kg/cm$^2$.

Figure 2:
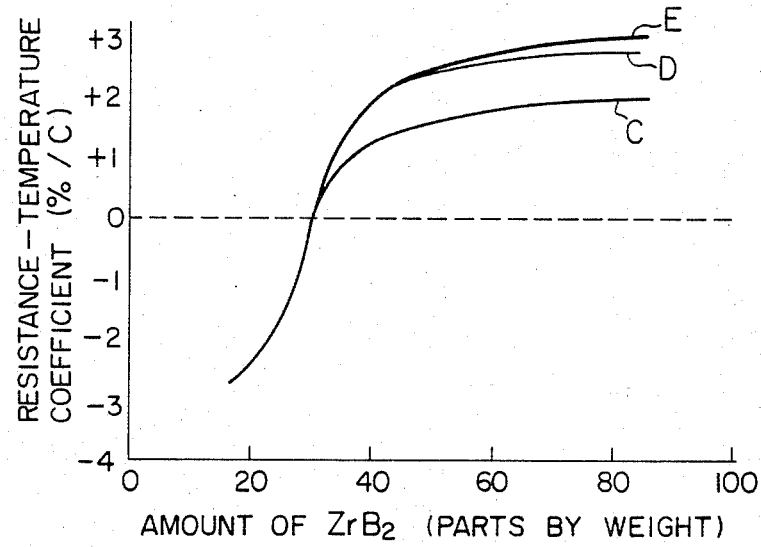
FIG. 2 is a graph showing the relation between resistance-temperature coefficient and mixed amount of the additive in said ceramics.

This molding was then placed in a graphite-made die and subjected to hot press sintering under a vacuum of $10^{-3}$ to $10^{-5}$ Torr under the conditions of 200 kg/cm$^2$, 1,700° C. and 1 hour. The thus obtained $Al_2O_3/ZrB_2$ composite ceramic was a dense sintered body having a theoretical relative density above 95%. The relation between the resistivity of the ceramic and the amount of $ZrB_2$ was found as shown by curve A in FIG. 1. From FIG. 1 it is found possible to obtain the ceramic having a desired resistivity within the range of $10^3$ to $10^{-5}$ $\Omega$cm by properly selecting the mixing amount of $ZrB_2$ not less than 20 parts by weight. The resistance-temperature coefficient as determined from the resistivity/temperature relation of the ceramic was found as shown by curve D in FIG. 2, which indicates that the ceramic has a positive resistance-temperature coefficient when the amount of $ZrB_2$ mixed is greater than about 30 parts by weight.

EXAMPLE 2

ZrC and ZrN powders (each having an average particle size of 2 $\mu$m) each was mixed in various amounts with $Al_2O_3$ as used in Example 1, and the mixtures were molded and hot-press sintered under the same conditions as in Example 1 to prepare both $Al_2O_3$-ZrC and $Al_2O_3$-ZrN composite ceramic materials. The relation between the resistivity and mixed amount of electroconductive material of both the types of composite ceramics was substantially as shown by curve A in FIG. 1. Also, ceramic materials having a positive resistance-temperature characteristic could be obtained when the mixed amount of ZrC or ZrN was greater than about 30 parts by weight as in the case of Example 1.

EXAMPLE 3

50 parts by weight of an $Al_2O_3$ powder (average particle size: 0.5 $\mu$m) and 50 parts by weight of a $ZrB_2$ powder (average particle size: 2 $\mu$m) were mixed, and to this mixture were added an AlN powder (average particle size: 2 $\mu$m) and an MgO powder (average particle size: 2 $\mu$m) in amounts of 2% by weight and 0.5% by weight, respectively, based on the total amount of the mixture. The mixed powder was compression molded under 1,000 kg/cm$^2$ and then hot press sintered under the conditions of 200 kg/cm$^2$, 1,600° C. and one hour (retention time) to form a composite ceramic material. It had a theoretical relative density of 95%, a resistivity of $2 \times 10^{-3}$ $\Omega$cm at room temperature, a resistance-temperature coefficient (20°-500° C.) of +2.3%/°C. and a bending strength of 20 kg/mm$^2$. This product was thus dense, high in mechanical strength and low in electrical resistance.

EXAMPLE 4

A U-shaped heater (resistance: 0.1 $\Omega$; resistivity: $4 \times 10^{-3}$ $\Omega$cm) such as shown in FIGS. 3(a) and (b) was made by using the electroconductive ceramic material obtained in Example 3. The heater terminal voltage $V_H$, current $I_H$ and the temperature $T_H$ of a heater end (5)—this portion is red heated—at the time of application of a DC voltage of 12 V to the terminals 3 and 4 of this heater are shown in FIG. 4. As seen from this graph, the heater end temperature rose to 900° C. in about 0.7 second, 1,200° C. in about one second and 1,500° C. in about 1.5 second, indicating the quickly heated character of the heater. The ceramic material also showed a positive resistance-temperature characteristic, that is, the current applied to the heater decreases as the heater temperature rises. This is an especially favorable property in use of the material of this invention for heaters since such property is helpful to prevent fusing of the heater or other troubles due to thermorunaway.

Also, the heater according to this Example showed absolutely no change of resistivity even after 100,000 times repeated current supply, each cycle consisting of 2-second application of DC voltage of 8 V to the heater (during this period, the heater temperature reaches 1,100° C. maximum) and 10-second pause of the application (during this period, forced air cooling is made). Thus, the heater had very excellent endurance to repeated current supply and could well stand quick and intermittent heating from room temperature to 1,100° C.

EXAMPLE 5

An $Al_2O_3$ powder having an average particle size of 0.5 μm and a $TaB_2$ powder having an average particle size of 2 μm were mixed in various ratios, and each mixture was further added with a 3% PVA solution in an amount of 10% based on the whole amount of the mixture and mixed by a stirring kneader. Then the mixed powder was molded under a pressure of 1,000 kg/cm$^2$, and this molding was placed in a graphite die and hot press sintered under a vacuum of $10^{-3}$ to $10^{-5}$ Torr under the conditions of 200 kg/cm$^2$, 1,700° C. and one hour. Each of the thus obtained $Al_2O_3/TaB_2$ composite ceramic materials was a dense sintered body having a relative density above 95%. The relation between the resistivity of the ceramic and the mixed amount of $TaB_2$ was indicated as shown by curve B in FIG. 1. It is thus found possible to obtain the ceramic materials having a desired resistivity within the range of $10^3$ to $10^{-5}$ Ωcm by selecting the mixed amount of $TaB_2$ greater than 20 parts by weight. Also, the resistance-temperature coefficient of the ceramic materials as determined from the relation between the ceramic resistivity and temperature was indicated as shown by curve C in FIG. 2, which teaches that the ceramic materials have a positive resistance-temperature coefficient in the region where the mixed amount of $TaB_2$ is greater than about 30 parts by weight.

EXAMPLE 6

A TaC or TaN powder (each having an average particle size of 2 μm) was mixed in various amounts with an $Al_2O_3$ powder as used in Example 1, and the mixtures were molded and hot press sintered under the same conditions as in Example 1 to make a $Al_2O_3/TaC$ or $Al_2O_3/TaN$ composite ceramic. The relation between the resistivity and mixed amount of electroconductive material of both the types of composite ceramic was substantially as shown by curve B in FIG. 1. A ceramics having a positive resistance-temperature coefficient was obtained by mixing TaC or TaN in a greater amount than about 30 parts by weight as in the case of Example 5.

EXAMPLE 7

50 parts by weight of an $Al_2O_3$ powder (average particle size: 0.5 μm) and 50 parts by weight of a $TaB_2$ powder (average particle size: 2 μm) were mixed, and to this mixture were added an $Al_2O_3$ powder (average particle size: 2 μm) and an MgO powder (average particle size: 2 μm) in amounts of 2% by weight and 0.5% by weight, respectively, based on the total amount of the mixture, and the mixed powder was compression molded under 1,000 kg/cm$^2$ and then hot press sintered under the conditions of 200 kg/cm$^2$, 1,600° C. and one hour (retention time) to form a composite ceramic material. This composite ceramic material had a relative density of 95%, a resistivity of $5 \times 10^{-3}$ Ωcm at room temperature, a resistance-temperature coefficient (20°–500° C.) of +1.5%/°C. and a bending strength of 20 kg/cm$^2$. It was thus dense, high in mechanical strength and low in electrical resistance and hence well electroconductive.

EXAMPLE 8

A U-shaped heater (resistance: 0.1 Ω; resistivity: $4 \times 10^{-3}$ Ωcm) by using the electroconductive ceramic material obtained in Example 7. The heater terminal voltage $V_H$, current $I_H$ and heater end temperature $T_H$ at the time of application of a DC voltage of 12 V to the heater terminals 3 and 4 are shown in FIG. 4, from which it will be seen that the heater end temperature rose to 900° C. in about 0.7 second, 1,200° C. in about one second and 1,500° C. in about 1.5 second, which indicates the quickly heated character of the heater. It also had a positive resistance-temperature characteristic, that is, the current applied to the heater decreases as the heater temperature increases upon connection to power. This proves to be a very favorable property in use of the material of this invention as a heater because such property allows prevention of heat fusing of the heater and other troubles due to thermorunaway.

Also, the heater according to this Example showed no change of resistivity even after continuous 100,000 times repeated current supply, each cycle consisting of 2-second application of DC 8 V to the heater (during this period, the heater temperature reaches 1,100° C. maximum) and 10-second pause of the application (during this period, forced air cooling is made). Thus, this heater has excellent endurance to repeated current supply and can withstand quick and intermittent heating from room temperature to 1,100° C.

EXAMPLE 9

An $Al_2O_3$ powder having an average particle size of 0.5 μm and a $TiB_2$ powder having an average particle size of 2 μm were mixed in various ratios, and each mixture was added with a 3% PVA solution in an amount of 10% based on the total amount of the mixture and mixed by a stirring kneader. Then the mixed powder was molded under 1,000 kg/cm$^2$, and the molding was placed in a graphite die and subjected to hot press sintering under a vacuum of $10^{-3}$ to $10^{-5}$ Torr under the conditions of 200 kg/cm$^2$, 1,700° C. and one hour. Each of the resultant $Al_2O_3/TiB_2$ composite ceramic materials was a dense sintered body having a relative density of 95%. The relation between the resistivity of the ceramics and mixed amount of $TiB_2$ was indicated as shown by curve A in FIG. 1. It is thus found possible to obtain ceramic materials having a desired resistivity within the range of $10^3$ to $10^{-5}$ Ωcm by properly selecting the mixed amount of $TiB_2$ not less than 20 parts by weight. The resistance-temperature coefficient as determined from the relation between the ceramic resistivity and temperature was as shown by curve E in FIG. 2, from which it is noted that the ceramic materials have a positive resistance-temperature coefficient when the amount of $TiB_2$ mixed is more than about 30 parts by weight.

EXAMPLE 10

A TiC or TiN powder (each having an average particle size of 2 μm) was mixed in various amounts with an Al$_2$O$_3$ powder as used in Example 9, and the mixtures were molded and hot press sintered under the same conditions as in Example 9 to produce the Al$_2$O$_3$/TiC and Al$_2$O$_3$/TiN composite ceramic materials. The relation between the resistivity and mixed amount of the electroconductive material in both the types of composite ceramic materials was substantially as shown by curve A in FIG. 1. A ceramic materials having a positive resistance-temperature characteristic was obtained by mixing TiC or TiN in an amount greater than about 30 parts by weight as in the case of Example 9.

EXAMPLE 11

50 parts by weight of Al$_2$O$_3$ powder (average particle size: 0.5 μm) and 50 parts by weight of TiB$_2$ powder (average particle size: 2 μm) were mixed, and to this mixture were further added an Al$_2$O$_3$ powder (average particle size: 2 μm) and an MgO powder (average particle size: 2 μm) in amounts of 2% by weight and 0.5% by weight, respectively, based on the total amount of the mixture, and the mixed powder was compression molded under 1,000 kg/cm$^2$ and then hot-press sintered under the conditions of 200 kg/cm$^2$, 1,600° C. and one hour (retention time) to prepare a composite ceramic material. This composite ceramic material had a relative density of 95%, a resistivity of 2.5×10$^{-3}$ Ωcm at room temperature, a resistance-temperature coefficient (20°–500° C.) of +2.5%/°C. and a bending strength of 25 kg/mm$^2$. It was thus dense, high in mechanical strength and low in electrical resistance.

EXAMPLE 12

Figure 3:
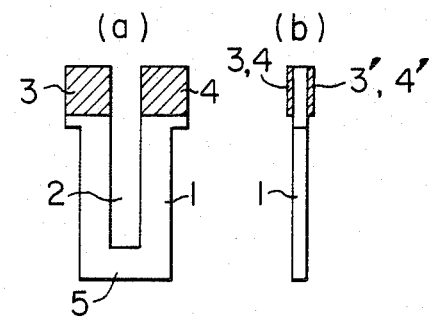
FIG. 3(a) is a plane view of an embodiment of the heater and (b) is a cross-sectional view thereof.
Figure 4:
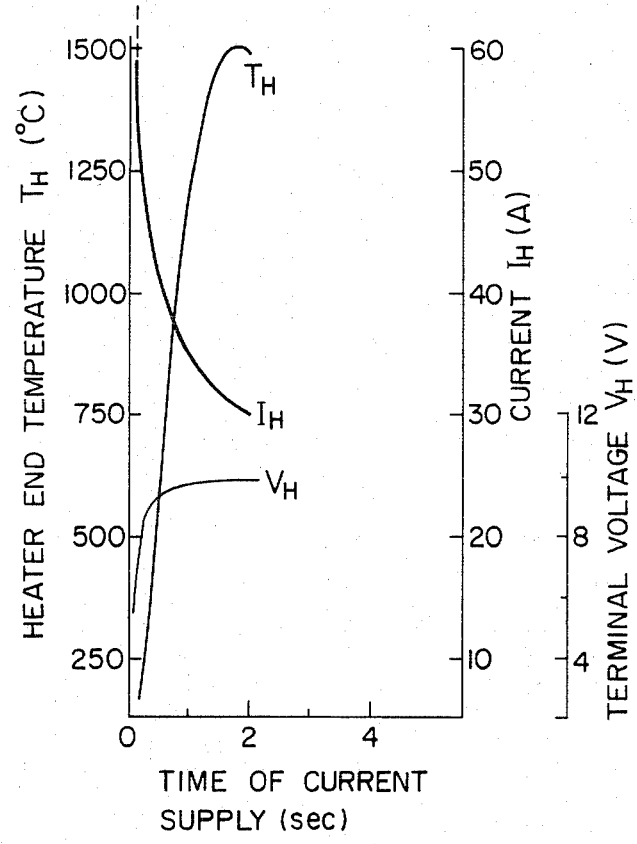
FIG. 4 is a characteristic diagram showing the performance of said heater.

A U-shaped heater (resistance: 0.1 Ω; resistivity: 4×10$^{-3}$ Ωcm) such as shown in FIG. 3 was made by using the electroconductive ceramic material obtained in Example 11. The heater terminal voltage V$_H$, current I$_H$ and heater end temperature T$_H$ at the time of application of DC 12 V to the heater terminals 3 and 4 were shown in FIG. 4. As seen from the graph, the heater end temperature rose to 900° C. in about 0.7 second, 1,200° C. in about one second and 1,500° C. in about 1.5 second, indicating the quickly heated character of this heater. This heater also had a positive resistance-temperature characteristic, that is, the current applied to the heater decreases as the heater temperature increases upon connection to power. This property is found especially advantageous in use of the material of this invention as a heater because such property is helpful to prevent fusing of the heater and other troubles due to thermorunaway.

Also, the heater according to this Example showed no change of resistivity even after continuous 100,000 times repeated current supply, each cycle consisting of 2-second application of DC 8 V to the heater (during this period, the heater temperature reaches 1,100° C. maximum) and 10-second pause of the application (during this period, forced air cooling is made). Thus, this heater is excellent in endurance to repeated current supply and can withstand quick and intermittent heating from room temperature to 1,100° C.

What is claimed is:

1. An electroconductive sintered ceramic which comprises 5 to 70 parts by weight of (a) alumina or an aluminous ceramic containing at least 95% by weight of Al$_2$O$_3$, and 30 to 95 parts by weight of (b) an inorganic compound which exhibits a positive resistance-temperature coefficient and which is selected from the group consisting of ZrB$_2$, ZrC, ZrN, ZrSi$_2$, TaB, TaC, TaN, TaSi$_2$, TiB$_2$, TiC, TiN, Mo$_2$B$_5$ and MoSi$_2$.

2. The electroconductive sintered ceramic according to claim 1, which has an electrical resistivity of not more than 1 Ωcm at room temperature and a positive resistance-temperature coefficient.

3. The electroconductive sintered ceramic according to claim 1, which further comprises as a sintering aid at least one substance selected from the group consisting of MgO, SiO$_2$, CaO, Li$_2$O and TiO$_2$.

4. The electroconductive sintered ceramic according to claim 3, further comprising as a particle growth regulator MgO.

5. The electroconductive sintered ceramic according to claim 4, wherein the total amount of the sintering aid and the particle growth regulator does not exceed 5% by weight based on the amount of the Al$_2$O$_3$ within said sintered ceramic.

* * * * *